(12) United States Patent
Hashimoto

(10) Patent No.: US 6,758,541 B2
(45) Date of Patent: Jul. 6, 2004

(54) PRINTING MACHINE AND THE METHOD OF REPORTING AN ERROR THEREOF

(75) Inventor: Koichi Hashimoto, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/963,453

(22) Filed: Sep. 27, 2001

(65) Prior Publication Data

US 2002/0039116 A1 Apr. 4, 2002

(30) Foreign Application Priority Data

Sep. 29, 2000 (JP) .................................... P2000-301283

(51) Int. Cl.⁷ .......................... B41J 29/38; B41J 2/195; B41J 5/30; G06F 15/00; G06K 1/00
(52) U.S. Cl. ..................... 347/5; 347/7; 347/8; 347/14; 347/16; 700/8; 400/74; 358/1.14; 358/1.15
(58) Field of Search .............................. 347/5, 7, 8, 14, 347/16; 700/8; 400/74; 358/1.14, 1.15

(56) References Cited

U.S. PATENT DOCUMENTS

| | | | | |
|---|---|---|---|---|
| 4,734,868 A | * | 3/1988 | DeLacy ................. | 271/265.03 |
| 4,745,602 A | * | 5/1988 | Morrell .......................... | 714/2 |
| 5,208,640 A | * | 5/1993 | Horie et al. ................. | 271/298 |
| 5,262,872 A | * | 11/1993 | Yoshimura et al. ........ | 346/33 R |
| 5,620,264 A | * | 4/1997 | Kagita .......................... | 400/74 |
| 5,625,757 A | * | 4/1997 | Kageyama et al. ........ | 358/1.14 |
| 5,777,634 A | * | 7/1998 | Okamura et al. ............. | 347/14 |
| 5,845,057 A | * | 12/1998 | Takeda et al. ............. | 358/1.15 |
| 5,889,595 A | * | 3/1999 | Kim et al. ..................... | 347/14 |
| 6,123,406 A | * | 9/2000 | Imai ............................. | 347/19 |
| 6,144,457 A | * | 11/2000 | Higuchi ..................... | 358/1.14 |
| 6,219,153 B1 | * | 4/2001 | Kawanabe et al. ........... | 347/14 |
| 6,275,299 B1 | * | 8/2001 | Beck ......................... | 358/1.15 |

FOREIGN PATENT DOCUMENTS

JP  11-348385  12/1999

OTHER PUBLICATIONS

Merriam–Webster's Collegiate Dictionary, Merriam–Webster, Tenth Edition.*

* cited by examiner

*Primary Examiner*—Lamson Nguyen
*Assistant Examiner*—Leonard Liang
(74) *Attorney, Agent, or Firm*—Nath & Associates PLLC; Marvin C. Berkowitz; Derek Richmond

(57) ABSTRACT

A printing machine as described has a plurality of image formation units each of which serves to perform an printing operation on a printing sheet. Particularly, the printing machine is capable of reporting an error in the printing operation in order to minimize the time period during which the printing machine does not work, and of effectively supporting the printing job of the user.

10 Claims, 7 Drawing Sheets

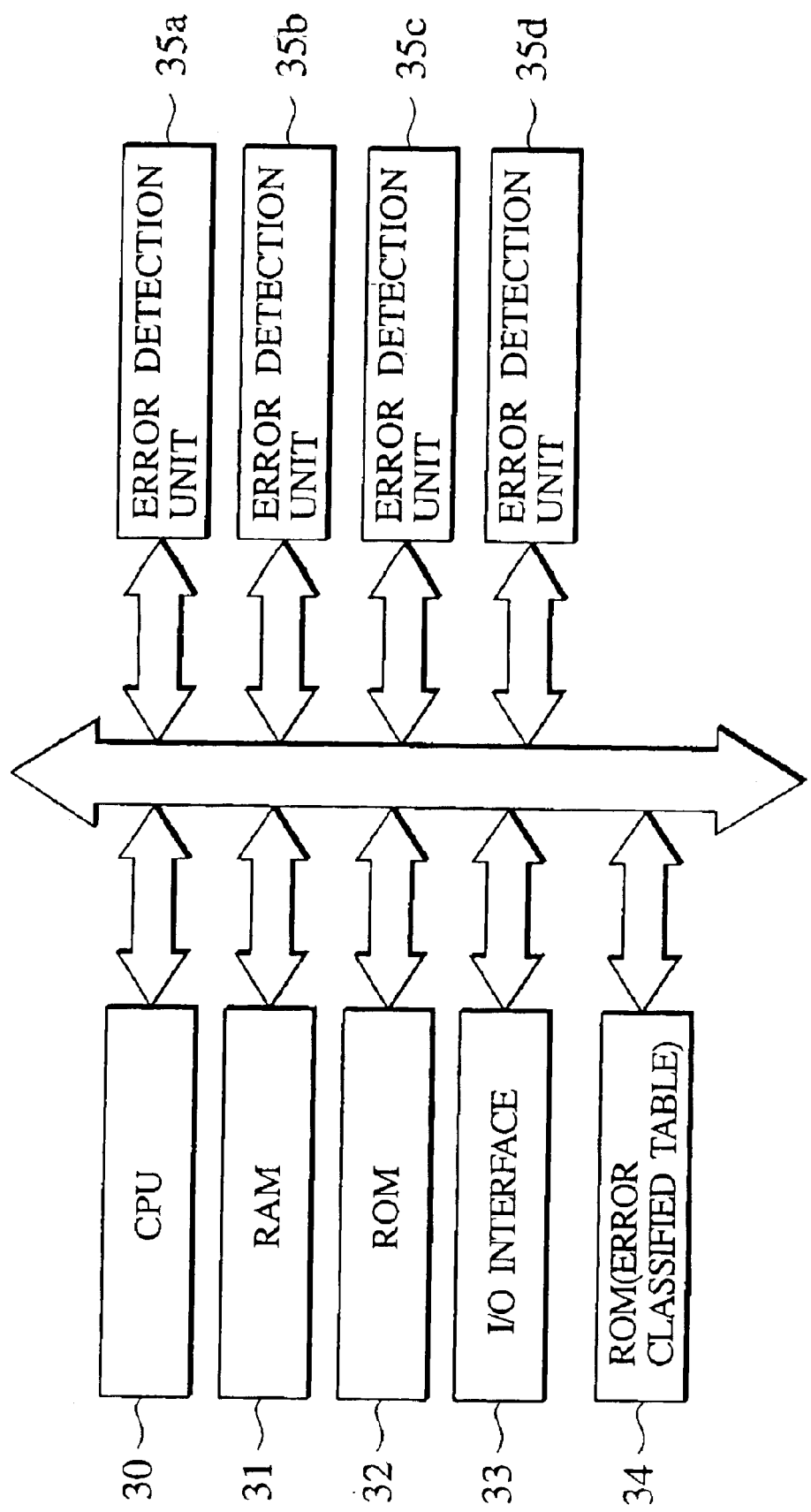

FIG.7A

| Ink error | Error type | Error class |
|---|---|---|
| | Paper discharge error | |
| No error occurs in all stages | No error occurs | No error occurs |
| | Error(s) occurs | Halting printing operation |
| Error occurs in a stage(s) with an operable stage(s) | No error occurs | Penalty in throughput |
| | Error(s) occurs | Halting printing operation |
| Errors occur in all stages | No error occurs | Halting printing operation |
| | Error(s) occurs | Halting printing operation |

FIG.7B

| Ink error | Error type | | Error class |
|---|---|---|---|
| | Paper transportation error in a paper feed unit(s) or in a stacking tray(s) | Paper transportation error in a collator(s) | |
| No error occurs in all stages | No error occurs in all stages | No error occurs | No error occurs |
| | | Error(s) occurs | While printing  Penalty in throughput<br>While collating  Halting collating operation |
| | Error occurs in a stage(s) with an operable stage(s) | No error occurs | Penalty in throughput |
| | | Error(s) occurs | While printing  Penalty in throughput<br>While collating  Halting printing operation |
| | Errors occur in all stages | Don't care | Halting printing operation |
| Error occurs in an stage(s) with an operable stage(s) | No error occur in a stage(s) having no ink error | No error occurs | Penalty in throughput |
| | | Error(s) occurs | While printing  Penalty in throughput<br>While collating  Halting collating operation |
| | Errors occur in all the stages having no ink error | Don't care | Halting printing operation |
| No error occurs in all stages | Don't care | Don't care | Halting printing operation |

PRINTING MACHINE AND THE METHOD OF REPORTING AN ERROR THEREOF

CROSS REFERENCE TO RELATED APPLICATIONS

This application claims benefit of priority under 35 USC §119 to Japanese Patent Application No. 2000-301283, filed on Sep. 29, 2000, the entire contents of which are incorporated by reference herein.

BACKGROUND OF THE INVENTION

1. Field of the Invention

The present invention is related generally to a printing machine having a plurality of image formation units each of which serves to perform an printing operation on a printing sheet and to a method of reporting an error in the printing operation. Particularly, the present invention is related to a technique of minimizing the time period during which the printing machine does not work, and of effectively supporting the printing job of the user.

2. Prior Art

In recent years, a printing machine becomes available which is provided with a plurality of image formation units each of which serves to print visual information to be printed on a print paper for example as described in Japanese Patent Published Application No. Hei 11-348385.

Within such a printing machine having a plurality of image formation units as described above, the image formation unit in the first stage may have run out of ink. In this case where ink has been used up in the first image formation unit to indicate an ink exhaustion error, needless to say, it is necessary to supply the cartridge of the image formation unit in the first stage with ink in order to maintain the full scope of the performance by the printing machine. However, if the user is not so interested in maintaining the throughput of the printing operation, it is possible to continue the printing operation without problems by the use of the remaining units of the image formation units and postpone replenishing the image formation unit in the first stage with ink. Namely, if the user is not so interested in maintaining the throughput of the printing operation, it is possible to complete the printing operation by the printing machine in which an ink exhaustion error occurs as long as there is at least one image formation unit which does not have run out of ink yet.

On the other hand, other considerations have to be given to the case where a paper jam error occurs at the sheet discharge roller of the paper receiving tray in such a printing machine. Namely, in the case where all the image formation units share a single paper receiving tray, it is impossible to continue the printing operation when a paper jam error occurs at the sheet discharge roller of the paper receiving tray.

Accordingly, in the case of the printing machines provided with a plurality of image formation units, errors are classified into printing operation halting errors and printing operation continuable errors. In the case of a printing operation continuable error, the printing operation can be continued while the recovery of the error is postponed. In the case of a printing operation halting error, the printing operation can not be continued until the error is recovered.

However, in the case of a conventional printing machine, particularly which is connected to an electronic network, the user is only informed of the current error by a message such as "the image formation unit in the third stage from the top has run out of ink", "a jam has occurred in the paper feed unit of the image formation unit in the fifth stage from the top" and so forth, but not informed of whether or not the printing operation can be continued by the printing machine.

Accordingly, in the case where a user makes use of a conventional printing machine, particularly which is connected to an electronic network, when a message indicative of an error is received, he has to go to the printing machine and confirm by himself whether or not the printing operation can be continued by the printing machine, so that much labour and much time may be required to complete the printing operation. Furthermore, even when the user arrives at the printing machine, there is no means for confirming which the current error is a printing operation continuable error or a printing operation halting error so that it is impossible to efficiently recover the error.

Generally speaking, in such a multi-stage type of a printing machine having a plurality of image formation units, there are many locations where errors can occur because of the multi-stage configuration as compared with printing machines having a single image formation unit. For example, while the paper feed and discharge units are possible sites in the paper transportation path in which a paper jam error can occur, the number of possible sites is double the number of the stages in the multi-stage type of a printing machine having a plurality of image formation units. Since there are provided the same number of the image formation units as the stages are, the number of the possible sites is proportional to the number of the stages in the multi-stage type of a printing machine having a plurality of the ink jet type image formation units in which an ink exhaustion error can occur. Accordingly, the above described problems are problems which frequently occur in a printing machine having a plurality of image formation units so that a solution has to be provided without delay.

SUMMARY OF THE INVENTION

The present invention has been made in order to solve the conventional shortcomings as described above. It is an object of the present invention to provide a printing machine with which it is possible to minimize the time period during which the printing machine does not work, effectively supporting the printing job of the user.

Also, it is another object of the present invention to provide a method of reporting an error which occurs in a printing machine in order to minimize the time period during which the printing machine does not work, effectively supporting the printing job of the user.

In order to solve the problem as described above, the inventor of the present invention has culminated the technical idea that it becomes possible to minimize the time period during which the printing machine does not work, effectively supporting the printing job of the user, by judging whether or not the current error is an error with which the printing operation can be continued by the printing machine and reporting the judgment result to the user.

In brief, the above and other objects and advantages of the present invention are provided by a new and improved printing machine comprising:

a plurality of image formation units each of which serves to perform an printing operation on a printing sheet;

a paper feed mechanism which serves to supply said image formation units with printing sheets;

a printed sheet transportation mechanism which serves to transport the printing sheet having been printed from said image formation unit;

an error detection unit which serves to detect an error occurring in said printing machine;

a storage device which serves to store an error classified table in which possible errors occurring in said printing machine are classified into at least one error with which the printing operation can be continued and at least one error with which the printing operation can not be continued; and a control unit which serves to judge whether or not a current error is an error with which the printing operation can be continued or an error with which the printing operation can not be continued.

In a preferred embodiment, further improvement resides in that said control unit is capable of taking control of said printing machine in order to continue said printing operation without suspending said printing operation when said control unit judges occurrence of an error with which said printing operation can be continued.

In a preferred embodiment, further improvement resides in that said control unit is capable of reporting the result of judgment to the user.

In a preferred embodiment, further improvement resides in that said control unit is capable of reporting the result of judgment to the user as well as information of the penalty in throughput when a current error as detected is an error with which the printing operation can be continued.

In a preferred embodiment, further improvement resides in that said control unit is capable of reporting the result of judgment to the user as well as information of the penalty in throughput when a current error as detected is an error with which the printing operation can be continued.

In accordance with a further aspect of the present invention, the above and other objects and advantages of the present invention are provided by a new and improved method of reporting an error in the printing machine having a plurality of image formation units each of which serves to perform an printing operation on a printing sheet, said method comprising:

an error detecting step of detecting an error which occurs in said printing machine;

an error reporting step of reporting the error as detected in said error detecting step as well as information of whether or not the printing operation can be continued by said printing machine with the error.

In a preferred embodiment, further improvement resides in that information of the penalty in throughput is reported when a current error as detected is an error with which the printing operation can be continued.

BRIEF DESCRIPTION OF DRAWINGS

The aforementioned and other features and objects of the present invention and the manner of attaining them will become more apparent and the invention itself will be best understood by reference to the following description of various embodiments of the present invention taken in conjunction with the accompanying drawings, wherein:

FIG. 3 is a block diagram showing the control unit of the printing machine in accordance with the embodiment of the present invention.

FIG. 7 is a schematic diagram showing the configuration of the error classified table in accordance with the embodiment of the present invention.

DETAILED DESCRIPTION OF EMBODIMENTS

Hereinbelow, several preferred embodiments in accordance with the present invention will be explained in conjunction with the accompanied drawings.

The printing machine and the method of reporting an error occurring in the printing machine in accordance with the present invention are applicable, for example, to multi-stage types of printing machines having a plurality of ink jet type image formation units. When an error is reported, it is possible for the user to confirm whether the current error is a printing operation continuable error or a printing operation halting error and therefore to minimize the time period during which the printing machine does not work, effectively supporting the printing job of the user. Meanwhile, the present invention is applicable not only to ink jet type printing machines but also applicable to other types of printing machines such as laser beam printing machines, thermal transfer printing machines and so forth, with which both types of errors can occur, i.e., the printing operation continuable error with which the printing operation can be continued while the recovery of the error is postponed and the printing operation halting error with which the printing operation can not be resumed until the error is recovered.

Next, the printing machine and the method of reporting an error occurring in the printing machine in accordance with an embodiment of the present invention will be explained in details with reference to FIG. 1 through FIG. 7.

The Configuration of the Printing Machine

First, with reference to FIG. 1, the printing machine in accordance with an embodiment of the present invention will be explained.

Figure 1:
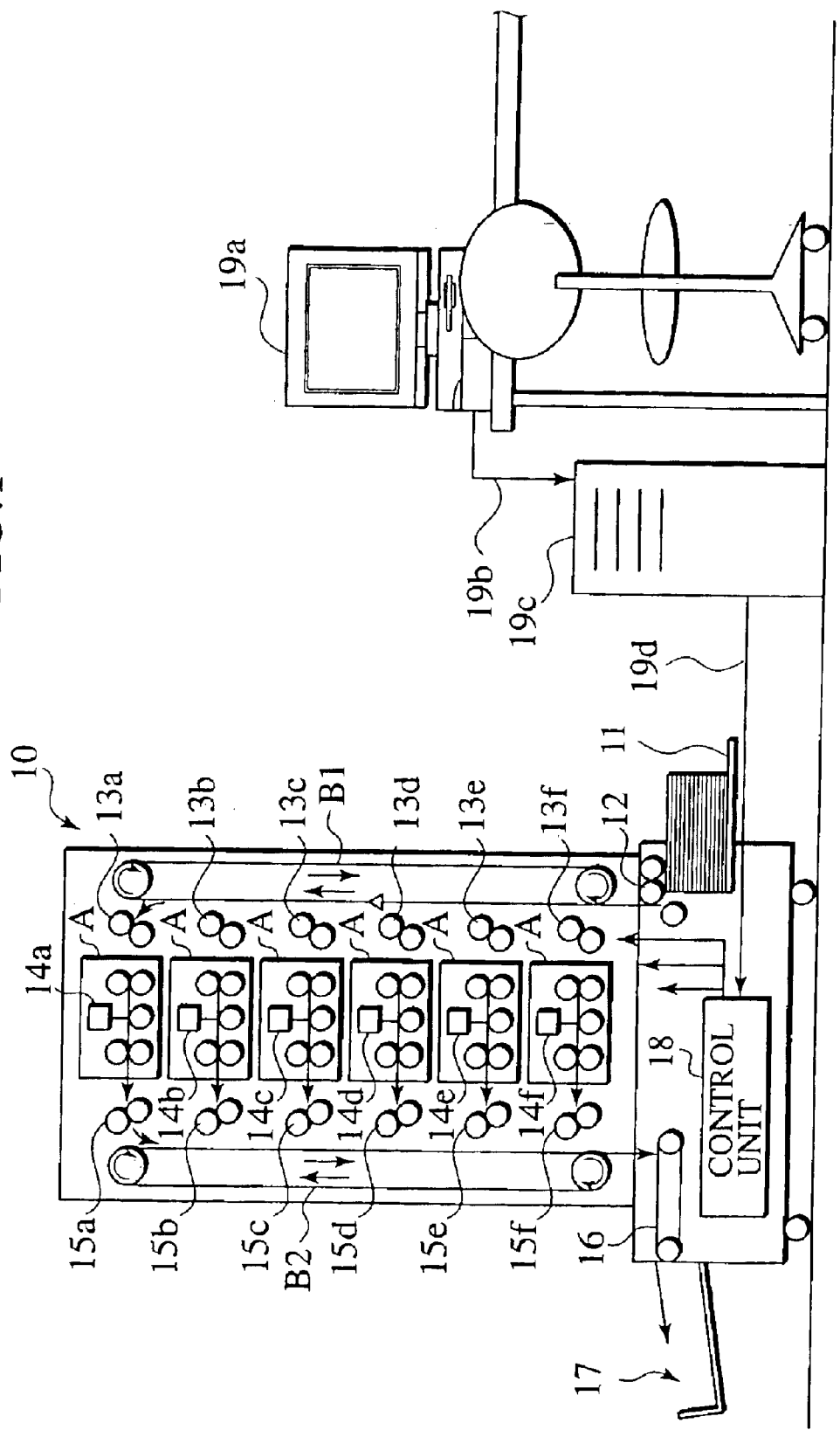
FIG. 1 is a schematic diagram showing the configuration of the printing machine in accordance with an embodiment of the present invention.

FIG. 1 is a schematic diagram showing the configuration of the printing machine in accordance with an embodiment of the present invention.

As illustrated in FIG. 1, the printing machine in accordance with the embodiment is composed of a paper feed unit 11, a paper feed roller 12 for picking up a printing sheet from the paper feed unit 11, a transfer belt B1 which is located over the paper feed unit 11, the paper feed roller 12 serving to feed the printing sheet to the transfer belt B1, the transfer belt B1 serving to upwardly transport the printing sheet as supplied from the paper feed roller 12, a plurality of image formation units A serving to print the visual information to be printed on a printing sheet in accordance with instructions given from a control unit 18 by driving ink cartridges 14a to 14f, paper feed rollers 13a to 13f for selectively picking up a printing sheet by means of a separating hook and the like in order to feed the printing sheet as transported on the transfer belt to the corresponding image formation unit A, a transfer belt B2 provided in the opposition position to the transfer belt B1, sheet discharge rollers 15a to 15f serving to feed the printing sheet to the transfer belt B2, the transfer belt B2 serving to downwardly transport the printing sheet as supplied from the sheet discharge rollers 15a to 15f, a sheet discharge roller 16 serving to transport the printing sheet as discharged by the transfer belt B2 to a paper discharge unit 17 serving to receiving printing sheets on which is printed visual information to be printed.

The printing machine in accordance with the embodiment of the present invention is electrically connected to a computer system 19a through a controller 19c and serves to perform a printing operation as instructed through the computer system 19a.

The controller 19c is electrically connected to the computer system 19a, for example, through a cable 19b compliant with IEEE 1284 and stores image data and pagination information in a storage device within the controller 19c. Also, the controller 19c is electrically connected to the printing machine 10 through a cable 19d and transmits, to the control unit 18 of the printing machine 10, the image data and the pagination information as received from the computer system 19a and stored in the storage device.

Figure 2:
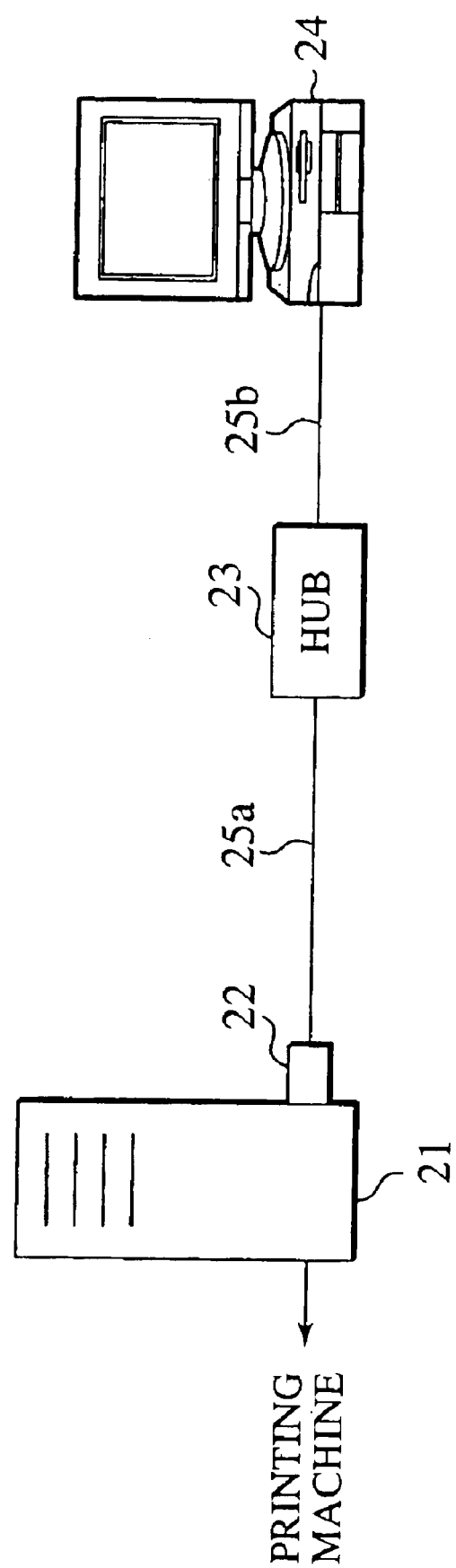
FIG. 2 is a schematic diagram showing the configuration of the printing machine in accordance with an embodiment of the present invention as connected to an electronic network.

Meanwhile, in the case where the computer system 19a and the printing machine 10 can not be located close to each other, the computer system 19a and the printing machine 10 are connected to each other through an electronic network such as a LAN (Local Area Network) and so forth. For this purpose, as illustrated in FIG. 2, a printer server 22 is provided for the controller 21. The printer server 22 is connected through a cable 25a to a hub 23 functioning as a digital concentrator system which is in turn connected to the computer system 24 through the cable 25b. The printer server 22 is a device serving to connect the controller 21 and the computer system 24 through the LAN for providing communication with the computer system 24 in accordance with the protocol as used in the LAN in order that the image data and the pagination information as received from the computer system 24 to the controller 21.

Although not shown in the figure, if the network interface card as installed in the computer system 24, the cable 25b, the hub 23, the cable 25aand the printer server 22 are selected to use the 100-baseT protocol, the lengths of the cable 25a and the cable 25b can be extended to 100 meters so that it is possible to construct a wide area printing system.

Also, it is possible to install a network interface card within the controller 21 which can be directly connected to an electronic network such as a LAN. By this configuration, the printer server 22 can be dispensed with so that it is possible to create a printing system at a low cost.

The Configuration of the Control Unit

Next, with reference to FIG. 3, the control unit of the printing machine in accordance with the embodiment of the present invention will be explained.

FIG. 3 is a block diagram showing the control unit of the printing machine in accordance with the embodiment of the present invention.

As illustrated in FIG. 3, the control unit 18 of the embodiment is composed of a CPU (Central Processing Unit) 30, a RAM (Random Access Memory) 31, ROMs (Read Only Memories) 32 and 34 and an input/output interface 33.

The CPU 30 serves to perform several control operations in accordance with a program stored in and loaded from the ROM 32 such as the program routine for reporting an error by the use of several data items required for reporting errors which are loaded from the ROM 32.

The RAM 31 serves to provide a working area for temporarily storing program routines and data required for several operations to be performed by the CPU 30.

The ROM 32 serves to store several program routines such as the start-up routine of the printing machine, the program routine for reporting an error and so forth together with associated data and the like. Meanwhile, the ROM 32 is functioning as a computer-readable storage medium such as a magnetic memory, an optical memory or a semiconductor memory which can be accessed by the CPU 30. Also, the storage medium may be a fixed storage medium such as a hard disk drive or a transportable storage medium such as a CD-ROM (Compact Disc-Read Only Memory). Furthermore, the system may be configured so that the program files and the required data are transferred in part or in their entirety through an electronic network and so forth while the storage medium may be the storage medium installed within a server connected to the electronic network. Furthermore, the system may be configured so that a program may be transferred through a transmission medium such as an electronic network and so forth to a server and/or a client where the program is installed.

The input/output interface 33 is functioning as an input/output interface through which the image data to be printed and several control information is received from the controller 19c and/or the controller 21 and output to the CPU 30 and the RAM 31.

The ROM 34 serves to store an error classified table in which possible errors occurring in the printing machine 10 are classified into a group including errors with which the printing operation can be continued and a group including errors with which the printing operation can not be continued. Information as required is read out from the ROM 34 to the RAM 31 while the program routine for reporting an error is executed by the CPU 30. In the case of the printing machine in accordance with the embodiment of the present invention, the error classified table is prepared as illustrated in FIG. 7A. More specifically speaking, since the printing operation can not be continued with a paper discharge error occurring in the case of the printing machine 10 in accordance with the embodiment of the present invention, the paper discharge error is classified into the printing operation halting error. On the other hand, since the printing operation can be continued with an error indicative of running out of ink or an error indicative of the lack of an ink cartridge, the ink exhaustion error is classified into the printing operation continuable error. While there are provided two ROMs, i.e., the ROM 34 storing the error classified table and the ROM 32 storing the program and the like in the above description of the embodiment of the present invention, the error classified table can be stored in a relatively small memory area so that the ROM 34 may be dispensed with by storing the error classified table in the ROM 32.

The error detection units 35 (35a to 35d) serve to detect an error occurring within the printing machine 10 and output a detection signal to the CPU 30. Meanwhile, the error detection process can be implemented, for example, by the use of an optical sensor, a pressure sensor and so forth.

In the followings, practical examples of the error detection process will be explained.

The Ink Errors

The error detection unit 35 serves to check whether or not there is an ink cartridge with reference to the signal output from a mechanical switch which is pushed down when an ink cartridge is installed and serves to detect running out of ink and output an error detection signal to the CPU 30 when the accumulative consumption of ink as calculated from the previous replacement of the ink cartridge exceeds a predetermined amount.

The Paper Discharge Error

The error detection units 35 are provided with a reflection type or transmission type optical sensor implemented with a light beam transmitter/receiver in the vicinity of the paper feed roller or the sheet discharge roller, and serve to detect an error detection signal and output an error detection signal to the CPU 30 when a printing sheet has been retained for a predetermined time period after detection of the printing sheet by the optical sensor and therefore an error is judged to occur.

The Normal Operation of the Printing Machine

Next, the normal operation mode of the printing machine will be explained.

When the printing operation is initiated in the printing machine in accordance with the embodiment of the present invention, a printing sheet is supplied to the respective image formation units A by the paper feed roller 12 and the paper feed rollers 13a to 13f provided for the respective image formation units A. After the printing sheet is supplied to the image formation unit A, the control unit 18 takes control of the ink cartridges 14a to 14f provided in the respective image formation units A to print the image data on the printing sheet. When the printing operation is completed, the printing sheet is discharged from the respective image formation units A to the paper discharge unit 17 by the sheet discharge rollers 15a to 15f. In accordance with the printing machine as described above, it is possible to perform the printing operation of a large number of printing sheets in parallel by means of the plurality of the image formation units and to significantly improve the printing speed of a vast amount of printing task.

The Error Reporting Process

Next, the operation of the control unit will be explained in the case where an error occurs in the printing machine in accordance with the embodiment of the present invention.

In the case of the printing machine in accordance with the embodiment, the control unit initiate necessary operations when an error occurs in the normal operation mode as in the following description.

First, when the error detection units 35 detect an error within the printing machine 10, the error detection units 35 serve to output the error detection result to the CPU 30. In response to the error detection result, the CPU 30 judges whether the current error is a printing operation continuable error or a printing operation halting error with reference to the error classified table stored in the ROM 34. Then, the judgment is displayed in an output screen as illustrated in output screen 41 shown in FIG. 4A or output screen 43 shown in FIG. 4C in order to report the judgment to the user. Meanwhile, in the case where the printing machine is used through the computer system, the report is output to the output device of the computer system such as a monitor. Then, when the judgment is output from the CPU 30, the user sees the information from the CPU 30 and, if the current error is a printing operation halting error, immediately goes to the setting location of the printing machine to recover the current error. On the other hand, if the current error is a printing operation continuable error, the control unit serves to take control of the printing machine to continue the printing operation. Accordingly, in this case, the user does not necessarily have to recover the error particularly in a hurry unless there is no any other reason but can go to the setting location of the printing machine after completion of the printing operation.

In this manner, in accordance with the method of reporting an error of the embodiment, it is possible for the user to confirm whether the current error is a printing operation continuable error or a printing operation halting error and therefore to minimize the time period during which the printing machine does not work, effectively supporting the printing job of the user.

Figure 4A:
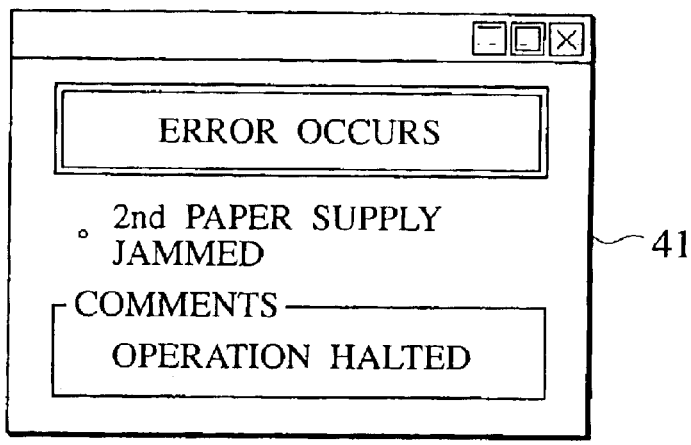
FIGS. 4A through 4C are a schematic diagrams showing windows indicative of error occurrence in accordance with the embodiment of the present invention.
Figure 4B:
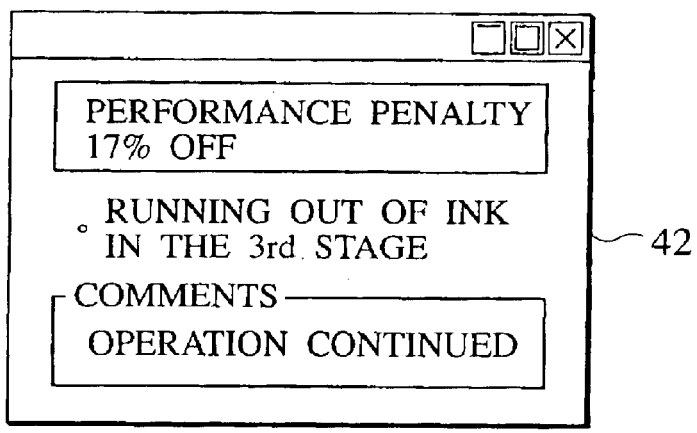
Figure 4C:
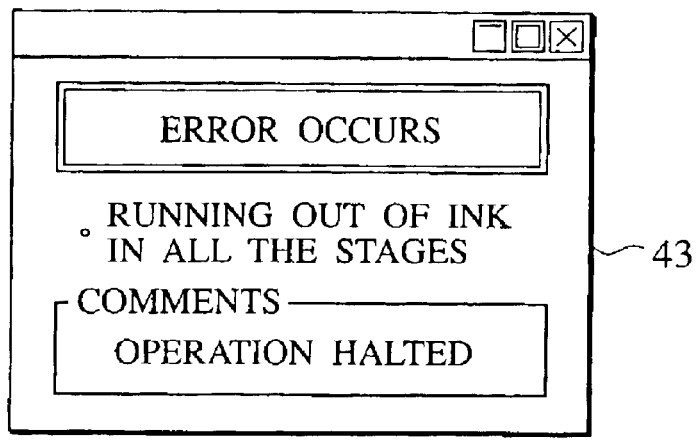

Meanwhile, the control unit can be designed to notify the user of the penalty in throughput when a printing operation continuable error occurs as illustrated in output screen 42 shown in FIG. 4B. When the penalty in throughput is reported, it is also possible for the user to quantitatively determine whether or not immediate recovery of the error is more effective to complete the printing operation until a desired time with reference to the information about the penalty in throughput.

In this case, the penalty in throughput can be calculated by dividing the number of part of the image formation units where errors occur by the number of all the image formation units in the printing machine. For example, if the ink exhaustion error occurs in two image formation units among all the six image formation units of the printing machine in accordance with the embodiment of the present invention, the penalty in throughput is calculated as (2/6)×100=33%. By notifying the user of the penalty in throughput, it is possible for the user to immediately recover the error if the penalty in throughput is undesirable or to continue the printing operation until it is completed if the penalty in throughput is acceptable. Namely, the user can select either case in accordance with his convenience relating to the degree of an urgent necessity. Meanwhile, the penalty in throughput can be obtained from the ROM 34 in which is stored the result of the calculation or obtained by calculating the penalty in throughput when an error occurs on a realtime basis.

Other Embodiments

The method of reporting an error in accordance with the present invention can be applied to any type of printing machines as long as an error classified table is stored in the ROM 34 and so forth. For example, the method of reporting an error in accordance with the present invention can be applied to the printing machine as illustrated in FIG. 5.

Figure 5:
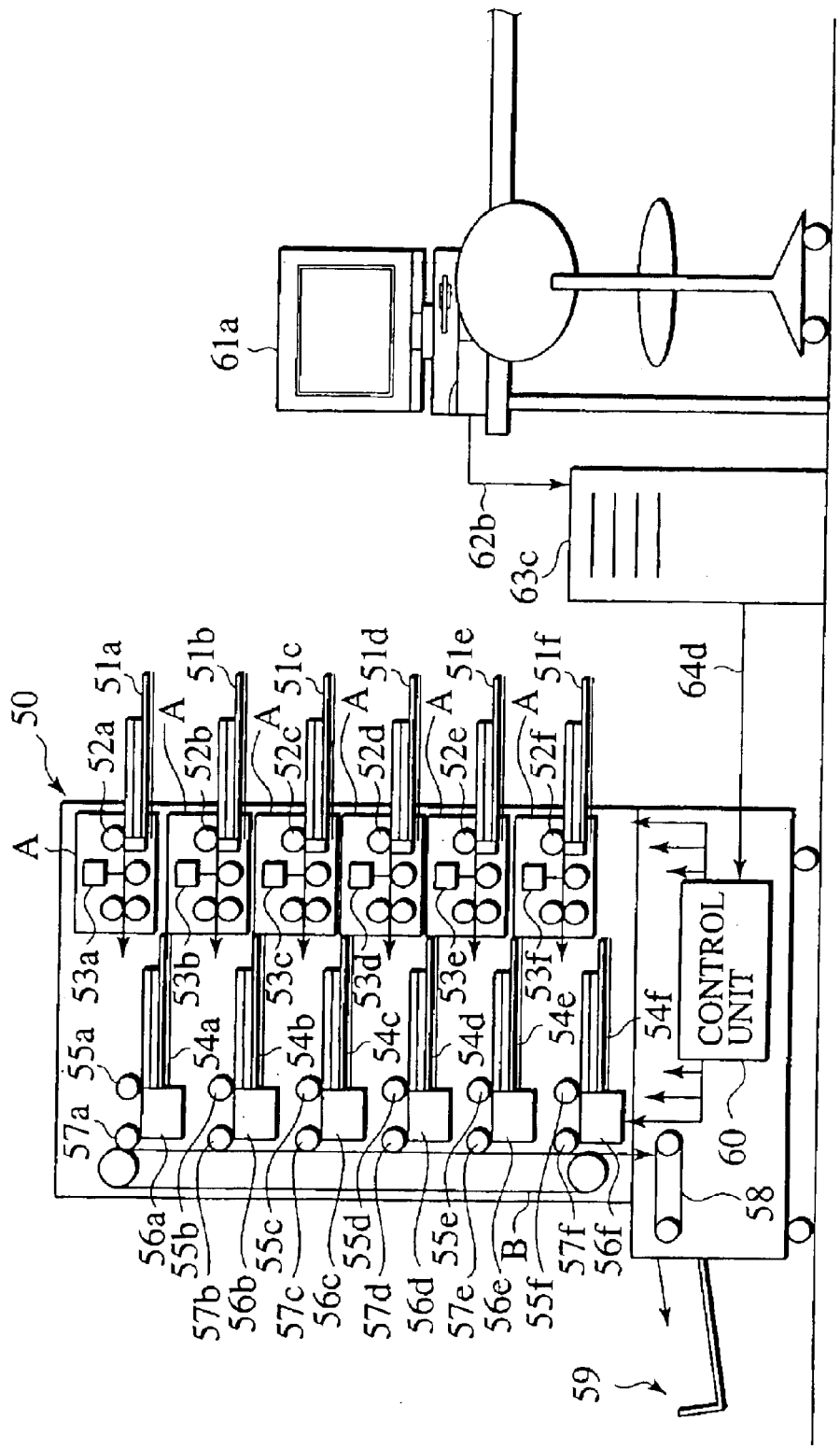
FIG. 5 is a schematic diagram showing the configuration of the printing machine in accordance with another embodiment of the present invention.

FIG. 5 is a schematic diagram showing the configuration of the printing machine in accordance with another embodiment of the present invention.

Similar to the embodiment shown in FIG. 1, in this embodiment of the present invention the printing machine 50 is electrically connected to a computer system 61a through a controller 63c. The controller 63c is electrically connected to the computer system 61a through a cable 62b. Also, the controller 63c is electrically connected to control unit 60 of printing machine 50 through a cable 64d.

Unlike the printing machine in accordance with the previous embodiment of the present invention, each image formation units A is provided with a separate paper feed unit 51a to 51f as illustrated in FIG. 5 each having a corresponding paper feed roller 52a to 52f; and a corresponding ink cartridge 53a to 53f, respectively. Then, after image is printed on a printing sheet supplied from any one off the paper feed units 51a to 51f in the same manner as the printing machine in accordance with the previous embodiment of the present invention, the printing sheet is placed for a while on a corresponding one of stacking trays 54a to 54f. Transfer rollers 55a to 55f transfer the printing sheet to corresponding collator units 56a to 56b which gathers the printing sheets printed by the respective image formation units A in order to arrange and output them in a proper sequence on the paper discharge unit 59 by means of the sheet discharge rollers 57a to 57f and 58. In accordance with such a printing machine, since each image formation unit A is provided with a private collating function, a large number of copies of a large number of pages can be performed within a short time so that it is possible to significantly improve the printing speed of a vast amount of printing tasks.

The method of reporting an error in accordance with the present invention can be applied to the printing machine as illustrated in FIG. 5 by providing the ROM 34 in which is stored an error classified table in which possible errors occurring in the printing machine 50 are classified into a group including errors with which the printing operation can be continued and a group including errors with which the printing operation can not be continued. Meanwhile, in the case of the printing machine 50, there are possible errors in the error classified table including the ink errors, the paper transportation errors at paper feed units 51a to 51f if or stacking trays 54a to 54f and the paper transportation errors at collator units 56a to 56f. These types of errors are classified into the printing operation continuable errors and the printing operation halting errors as illustrated in FIG. 7B. In the following description, the method of reporting an error in the case of the printing machine 50 will be explained with reference to FIGS. 6A to 6D and FIG. 7B.

Actual Example 1

Figure 6A:
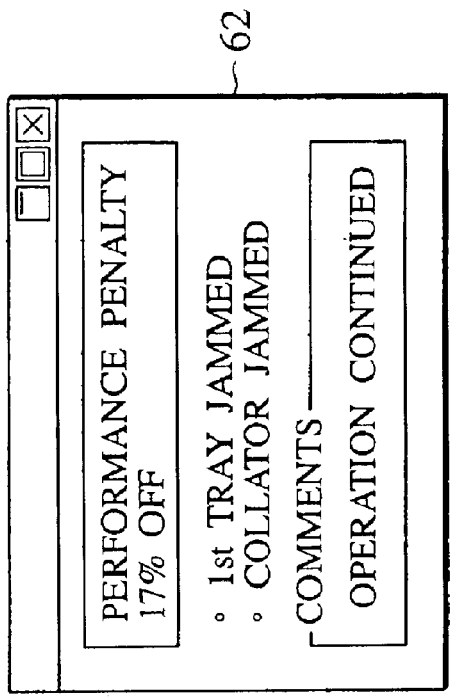
FIGS. 6A through 6D are a schematic diagrams showing windows indicative of error occurrence in accordance with said another embodiment of the present invention.

In the case where the paper feed unit 51a at the first stage is jammed with a printing sheet in the paper feed roller 52a during the printing operation, the error is the printing operation continuable error (with a performance penalty) among from the errors described in the error classified table as illustrated in FIG. 7B to indicate that no ink error occurs in all the stages, that a paper transportation error in the paper feed unit or in the stacking tray occurs in part of the stages but does not occur in at least one stage, and that no paper transportation error in the collator unit occurs in all the stages. In this case, since printing sheets as printed can be arranged in proper sequence with a throughput penalty by means of the collator unit 56a, the control unit serves to output a report 61 as illustrated in FIG. 6A. It is therefore possible for the user to immediately recover the error if the penalty in throughput is undesirable or to continue the printing operation to complete the printing operation by simply waiting if the penalty in throughput is acceptable.

Actual Example 2

Figure 6B:
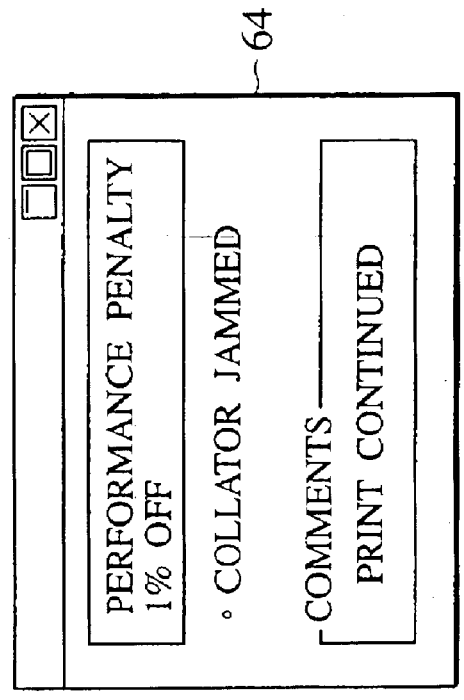
Figure 6C:
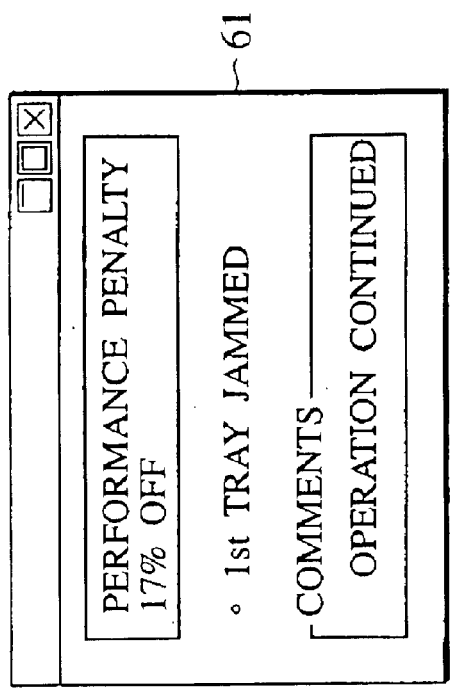

In the case where the paper feed unit 51a at the first stage is jammed with a printing sheet in the paper feed roller 52a and at the same time jammed with a printing sheet in the sheet discharge roller 57a during the printing operation, the error is the printing operation continuable error (with a performance penalty) among from the errors described in the error classified table as illustrated in FIG. 7B to indicate that no ink error occurs in all the stages, that a paper transportation error in the paper feed unit or in the stacking tray occurs in part of the stages but does not occurs in at least one stage, and that a paper transportation error in the collator unit occurs. In this case, since the printing operation can be continued with a performance penalty, the control unit serves to output an output window 62 as illustrated in FIG. 6B. It is therefore possible for the user to immediately recover the error if the penalty in throughput is undesirable or to continue the printing operation to complete the printing operation by simply waiting if the penalty in throughput is acceptable. However, when the printing operation is completed, the collating operation can not be performed so that the current error condition becomes "the collating operation impossible" so that the control unit serves to output an output window 63 as illustrated in FIG. 6C. At this time, the user has to recover the current error in order to perform the collating operation.

Actual Example 3

Figure 6D:
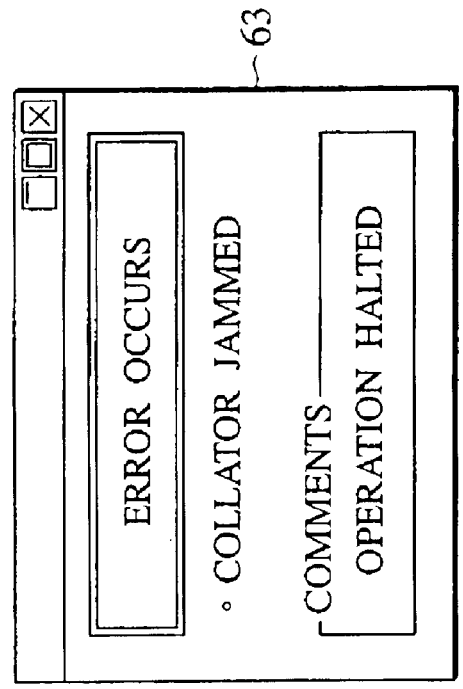

In the case where the sheet discharge roller 57a at the first stage is jammed with a printing sheet during the printing operation, the error is the printing operation continuable error (with a performance penalty) among from the errors described in the error classified table as illustrated in FIG. 7B to indicate that no ink error occurs in all the stages, that no paper transportation error in the paper feed unit or in the stacking tray occurs in all the stages, and that a paper transportation error occurs in the collator unit. In this case, since the printing operation can be continued with a performance penalty, the control unit serves to output an output window 64 as illustrated in FIG. 6D. Meanwhile, the output window 64 outputs a message that "THROUGHPUT PENALTY: 1% OFF" in this case since the throughput is decreased as compared with the case where the collator unit serves to perform the collating operation in parallel. The penalty in throughput is generally increased in progress of the printing operation. However, when the printing operation is completed in the image formation units, the collating operation can not be performed so that the current error condition becomes "the collating operation impossible". When the current error condition is changed, the control unit serves to output an output window 63 as illustrated in FIG. 6C. At this time, the user has to recover the current error in order to perform the collating operation.

The embodiment was chosen in order to explain most clearly the principles of the invention and its practical application thereby to enable others in the art to utilize most effectively the invention in various embodiments and with various modifications as are suited to the particular use contemplated.

What is claimed is:

1. A printing machine comprising:

a plurality of image formation units therein each of which serves to perform a printing operation of an image data on a printing sheet, said plurality of image formation units being used in parallel to improve printing speed of the printing machine;

a paper feed unit which serves to supply said image formation units with printing sheets;

a printed sheet transportation unit which serves to transport the printing sheets having been printed from each of said image formation units to a common output location;

an error detection unit which serves to detect an error occurring in said printing machine;

a computer readable ROM having an error classified table stored therein in which errors that can occur in said printing machine are classified, said classified table including at least one error on an occurrence of which a printing operation of at least one of said image formation units for the image data can be continued while a printing operation of another of said image formation units for the image data must be halted, and at least one other error on an occurrence of which printing operations of all of said image formation units for the image data must be halted; and a control unit comprising a CPU connected to said ROM, said CPU having an error judgment computer program executed thereon which computer program judges whether or not a detected error is an error with which a printing operation of at least one of said image formation units can be continued while a printing operation of another of said image formation units must be halted, or an error with which printing operations of all of said image formation units must be halted.

2. The printing machine as claimed in claim 1 wherein said control unit is capable of taking control of said printing machine in order to continue, without suspending, said printing operation when said control unit judges occurrence of an error with which said printing operation of at least one of said image formation units can be continued.

3. The printing machine as claimed in claim 2 wherein said control unit is capable of reporting the result of judgment to a user.

4. The printing machine as claimed in claim 3 wherein said control unit is capable of reporting information of the penalty in throughput when a detected error is an error with which the printing operation of at least one of said image formation units can be continued.

5. The printing machine as claimed in claim 1 wherein said control unit is capable of reporting the result of judgment to a user.

6. The printing machine as claimed in claim 5 wherein said control unit is capable of reporting information of the penalty in throughput when a detected error is an error with which the printing operation of at least one of said image formation units can be continued.

7. The printing machine as claimed in claim 1 wherein one of said CPU and said ROM are located remote from and connected to said printing machine via a network connection.

8. The printing machine as claimed in claim 1 wherein said control unit is capable of taking control of said printing machine in order to complete said printing operation when said control unit judges that said detected error is an error with which said printing operation of at least one of said image formation units can be continued.

9. A method of reporting an error in a printing machine having a plurality of image formation units therein each of which serves to perform a printing operation of an image data on a printing sheet, said plurality of image formation units being used in parallel to improve printing speed of the printing machine, and a printed sheet transportation unit which serves to transport the printing sheet from each of said image formation units to a common output location, said method comprising:

an error detecting step of detecting an error which occurs in said printing machine;

an error look-up step of looking up the error detected in said error detecting step in an error classified table stored on a ROM;

an error judging step of judging whether or not the detected error is an error with which the printing operation of at least one of said image formation units for the image data can be continued while a printing operation of another of said image formation units for the image data must be halted or an error with which the printing operation of all of said image formation units for the image data must be halted; and an error reporting step of reporting the error as detected in said error detecting step as well as information of whether or not the printing operation can be continued by said printing machine with the error.

10. The method of reporting an error as claimed in claim 9 further comprising reporting information of the penalty in throughput when a detected error is an error with which the printing operation of at least one of said image formation units can be continued.

* * * * *